May 2, 1961  F. F. CRANDELL  2,982,174
COMBINATION THREE-COLOR AND EXPOSURE PHOTOMETER
Filed April 20, 1956  2 Sheets-Sheet 1
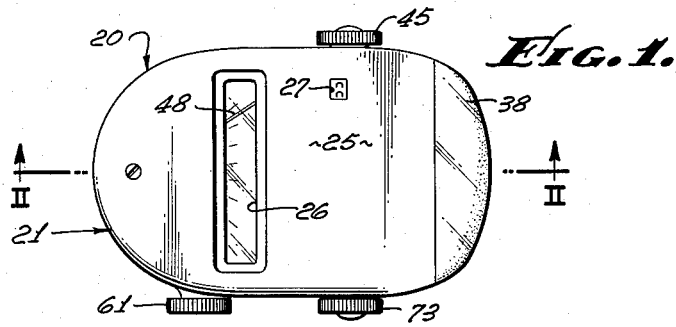
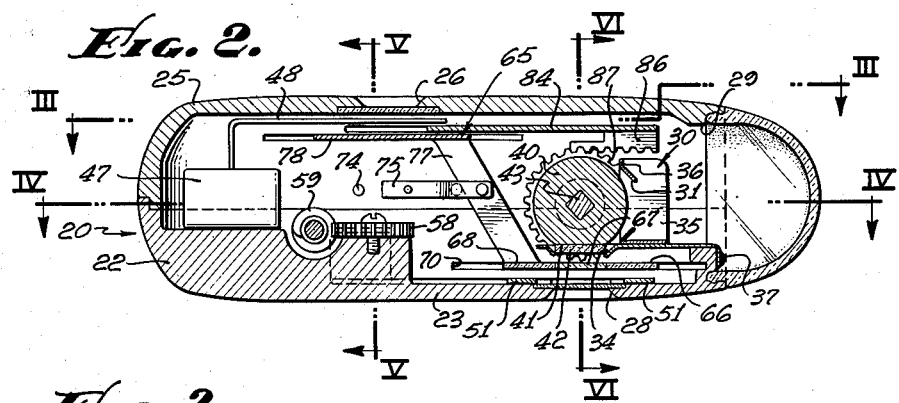
FRANK F. CRANDELL
INVENTOR.
BY
ATTORNEY.

May 2, 1961 F. F. CRANDELL 2,982,174
COMBINATION THREE-COLOR AND EXPOSURE PHOTOMETER
Filed April 20, 1956 2 Sheets-Sheet 2
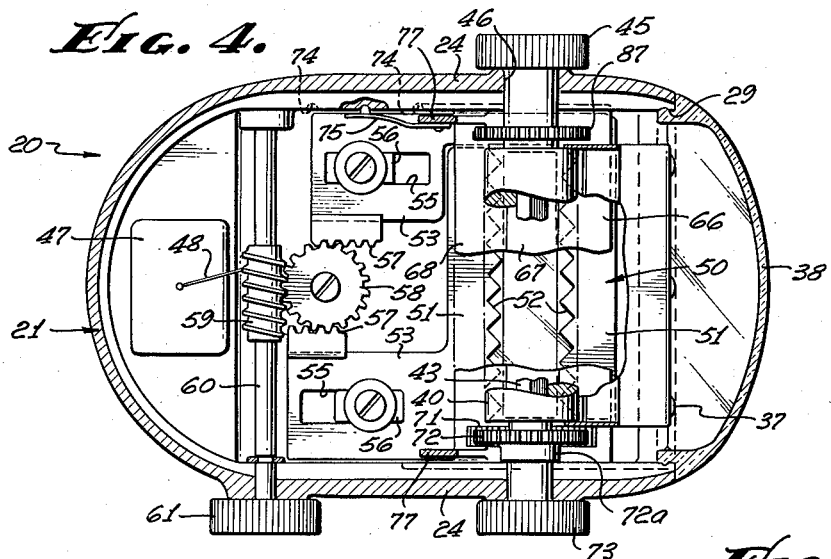
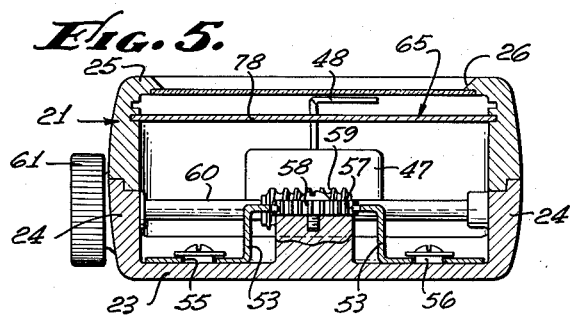
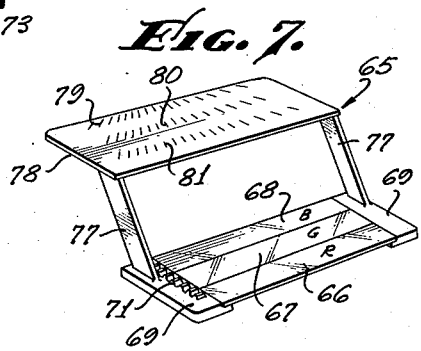
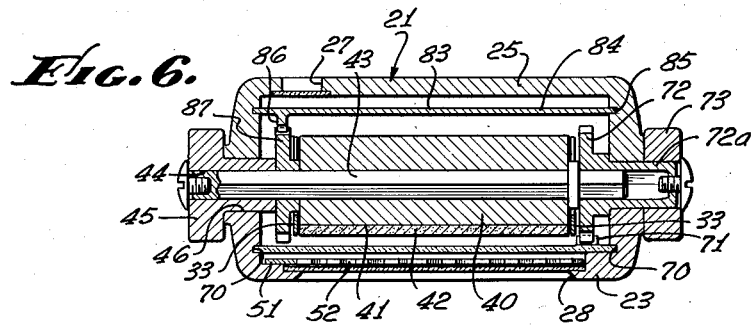
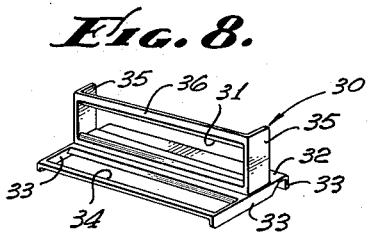
FRANK F. CRANDELL
INVENTOR.
BY
ATTORNEY.

United States Patent Office
2,982,174
Patented May 2, 1961

2,982,174
COMBINATION THREE-COLOR AND EXPOSURE PHOTOMETER
Frank F. Crandell, Pasadena, Calif., assignor to Photo Research Corporation, Hollywood, Calif., a corporation of California
Filed Apr. 20, 1956, Ser. No. 579,569
9 Claims. (Cl. 88—23)

This invention relates to a portable, small, compact three-color photometer and exposure meter for use in the photographic arts and in illumination engineering. More particularly, the invention contemplates a combination three-color meter and exposure meter of novel construction wherein the arrangement of light paths, light-responsive cell, scale and filter means provides simplicity of operation and facilitates inexpensive manufacture.

Accurate direct measurement of light characteristics has become increasingly important in order to produce on selected photographic film accurate photographic rendition of a subject being photographed. Light conditions during taking of a photograph, especially when uncontrolled, such as outside, and not under studio conditions, may vary rapidly and therefore it is important to quickly accurately and directly measure a desired light characteristic. Such light characteristics desired to be measured include intensity of illumination and color temperature. Intensity of illumination may be measured both with respect to incident and reflected light, incident light referring to light directly falling upon the subject and reflected light referring to light reflected from the subject. The present invention illustrates a photometer provided with a translucent light-collecting member for measuring incident light, but it is understood that a grid or reticulated member may be substituted therefore to measure reflected light if so desired.

Color quality of light is measured by color temperature and it is understood that color temperature may vary quite widely even though the intensity of light may remain constant. Color temperature is measured in degrees Kelvin and color sensitive film is provided for use under preselected light conditions having specified color temperature. Therefore, to produce accurate color rendition, measurement of color temperaure of light at the time of taking a photograph is necessary. Once color temperature is determined, various methods may be employed to properly select a color filter, or supplement the light source by adding additional selected light, or by modifying the voltage of a particular light source, the latter two being employable under controlled inside lighting conditions.

Heretofore, color temperature and color characteristics of light have been measured by comparing the energy of light at widely spaced wave length bands such as at the ends of the visible spectrum or at wave length bands generally referred to as red and blue. It has been found desirable to accurately measure the color temperature and the color quality of light as by measuring distribution and energy of three spaced wave length bands in the visible spectrum such as red, blue and green. The measurement of energy in such three spaced wave length bands permits measurement of color quality of light not only in a light source emanating light in a continuous light spectrum but also in a light source emanating a light in a discontinuous spectrum band. By thus comparing the amount of energy in an intermediate wave length band such as green with the amount of energy in wave length bands of red and blue light it may be readily accurately determined whether the color quality of light lies within acceptable tolerances of a particular selected color sensitive film.

In the measurement of light characteristics and color quality of light, it is understood that the more quickly, accurately, and directly such light characteristics can be measured, there is greater assurance that the resulting picture rendition will be accurate and a true color rendition. Thus, a direct reading of each of the above characteristics of light is essential and the use of charts and tables to determine light characteristics are to be avoided.

The primary object of this invention therefore is to disclose and provide a portable three-color photometer and exposure meter capable of measuring the above identified light characteristics directly, accurately and quickly.

An object of this invention is to disclose and provide such a combination photometer which is small, compact, capable of being readily held in a hand and operable in a simple direct manner.

Another object of this invention is to disclose and provide a combination three-color photometer and exposure meter wherein means are provided for cooperably associating a single light-responsive cell with one of a plurality of light paths so that a selected characteristic of light may be measured.

A further object of this invention is to disclose and provide a novel construction of a combination color and exposure photometer wherein a plurality of scales and a plurality of color filters are operably associated with the positioning of a single light-responsive cell so as to produce a direct reading of a selected light characteristic.

Another specific object of this invention is to disclose and provide a combination three-color photometer and exposure meter wherein the light-responsive cell and scale means are so associated that upon relative movement of one with respect to the other a selected light characteristic may be directly measured.

A still further object of this invention is to disclose a combination photometer as above described wherein light traveling along one path is automatically excluded from measurement when light along another path is being measured.

More specifically, this invention contemplates in a preferred embodiment of this invention a combination three color and exposure photometer provided with two light-admitting windows disposed in angularly related planes so as to admit light into the photometer along separate distinct angularly related light paths. A single light-responsive cell is operably positioned with respect to said light paths and is selectively movable into one or the other light path to receive light. Simultaneously and automatically with the selective positioning of the light cell, scale means are movable into position beneath a scale window for observation.

The invention contemplates, in addition to the novel arrangement of a single light-responsive cell and its relation to a plurality of light paths, a novel construction of a movable scale and color filter carrier means which may be operably associated with the movement of the light-responsive cell so as to position a proper scale beneath a scale window to read a selected characteristic of light being measured by a part of the filter means.

Generally speaking, this invention contemplates a combination three-color photometer and exposure meter which is compact and inexpensively manufactured and simple in operation. In a preferred embodiment, a casing is provided with a scale window on one wall and a light-admitting window on an opposite wall. The end of the casing is provided with a translucent end member for collecting and admitting light into the casing along a path perpendicular to light admitted through the light-admitting window in one of the walls. At the intersection of said light paths is mounted for rotation through 90° a light-responsive cell and means are provided for admitting only light from a selected path to said cell when operably positioned with respect to said path. Means for positioning the light-responsive cell are carried by the casing and are arranged so as to cause actuation of a scale means for positioning a scale beneath the scale window correlated to the position of the cell with respect to a selected light path. The light cell is operably connected in well known manner to a meter provided with an index observable beneath the scale window in relation to a selected scale.

The invention contemplates relative movement between the light cell and selected color filter means such as red, blue and green, said filter means being operably associated with a scale means for positioning a selected scale beneath the scale window. The invention also contemplates the cell and the scale means are movable simultaneously for determining selected characteristics of light admitted into the casing along a selected light path. In this invention relative movement between a cell and filter and scale means is provided for furnishing the above operable relationship.

It will be readily understood by those skilled in the art that numerous other advantages and objects of this invention will become readily apparent from the following description and drawings in which several exemplary embodiments of this invention are shown.

In the drawings:

Fig. 1 is a top plan view of a combination three-color photometer and exposure meter embodying this invention;

Fig. 2 is a sectional view taken in longitudinal plane indicated by line II—II of Fig. 1, said plane bisecting the photometer;

Fig. 3 is a top view of Fig. 2 with a major portion of the top wall broken away, the view being taken along the planes indicated by line III—III of Fig. 2.

Fig. 4 is a transverse sectional view taken in the plane indicated by line IV—IV of Fig. 2;

Fig. 5 is a vertical transverse sectional view taken in the plane indicated by line V—V of Fig. 2;

Fig. 6 is a transverse vertical sectional view taken in the plane indicated by line VI—VI of Fig. 2;

Fig. 7 is a perspective view of a scale and filter carrier means employed with the photometer of Fig. 1;

Fig. 8 is a perspective view of a transverse framing means for admitting light to a positionable cell embodied in the photometer shown in Fig. 1.

In the exemplary embodiment of this invention shown in Figs. 1 to 8, a combination color and exposure photometer is generally indicated at 20. The photometer 20 comprises a casing 21 of a size and shape which is readily adaptable to be held in the hand of a user. The casing 21 may be made of any suitable lightweight plastic or metal material capable of being readily molded and shaped.

The casing 21 may include a bottom casing portion 22 having a bottom wall 23 and upstanding side walls 24. Fitted on side walls 24 may be a top casing portion 25 which may serve as a top cover. The top casing portion 25 may be provided with a scale window 26 of generally rectangular shape, extending transversely thereof, and located in the central portion of the cover. At one side and spaced from scale window 26, the casing portion 25 may be provided with a small window 27 through which may be read letters such as "CC" or "EM" indicating position of a photo cell in the casing for taking color or exposure readings.

In this example, means to admit light along two angularly related paths (90°) may include a rectangular transversely disposed first light-admitting port 28 in bottom wall 23 and generally opposite to a transverse zone defined by window 27. A second light-admitting port 29 may be provided at one end of casing 21 which is open. To restrict and mask light received through said ports 28, 29 and to prevent unwanted stray light within the casing from falling upon a photo cell 42, a transversely disposed cell masking frame means 30 (Fig. 8) is provided, said frame means 30 defining openings 31 and 34 of similar size and shape lying in planes disposed at 90° and respectively aligned with ports 29 and 28. The masking frame means 30 may comprise a flat transversely extending plate 32 of thin material supported above bottom wall 23 by depending legs 33, said plate being provided with opening 34. Upstanding walls 35 on opposite sides of plate 32 may be joined by a top transverse member 36 which defines with plate 32 the opening 31. Each opening 31, 34 is further defined by angularly arranged or beveled peripheral edge portions of the walls of the frame means 30 so as to permit movement of the photocell as later described while masking said cell in virtually light-tight relation in each of its two operative positions. The cell masking frame means 30 may be readily insertable into the casing 21 through port 29 and may be secured to bottom wall 23 by any suitable securing means such as screws 37.

The port 29 may be covered by a translucent light-collecting end member 38 preferably made of suitable plastic material and fitted in well known manner to end edges of casing 21 at the open end thereof. The translucent light-collecting member 38 may be transversely elongated with a curved wall section whereby incident light may be admitted into casing 21.

At the intersection of the angularly related light paths, which occurs immediately behind opening 31 and above opening 34, a transversely extending generally cylindrical member 40 may be mounted with its axis coincident to the intersection of said light paths. Member 40 may be provided with a flat face 41 upon which may be mounted a rectangular flat light-responsive means or photo cell 42. Photo cell 42 may be slightly greater in size and shape than openings 31, 34 so that the light-responsive face of photo cell 42 completely fills opening 31 or 34 and is closely fitted thereto to prevent light leakage along peripheral edges of said openings.

Means for rotating and positioning photo cell 42 in either of said light paths may comprise a polygonal section shaft 43 having one end fixedly received within a complementary polygonal section bore 44 in a turning knob 45. Knob 45 may be mounted for rotation in a slot 46 provided in side wall 24 of the casing. The other end of shaft 43 is supported from the opposite side wall 24 in different manner as later described.

Photo cell 42 may be connected by suitable electrical leads (not shown) to a microammeter 47 of well known make and manufacture. The microammeter 47 may be secured in suitable manner to the bottom casing portion 22 and includes an index or pointer 48 movable in a plane beneath top wall 25 and observable through scale window 26.

Shutter means 50 for limiting the amount of light passing through port 28 may include a pair of transversely disposed reciprocally movable shutter blades 51, each provided with complementary opposed serrated edges 52. Each shutter blade 51 may be integral with one end of a longitudinally extending rack portion 53, each rack portion being guided by a longitudinal slot 55 therein which receives a guide shoe 56 secured to bottom wall 23. Each rack portion 53 includes rack teeth 57 meshed with a common gear 58 mounted therebetween on bottom wall 23. Gear 58 also engages a transversely disposed worm gear 59 carried by a shaft 60 journaled in side walls 24 of the casing. One end of shaft 60 projects externally of the casing and is provided with a turning knob 61 fixed thereto. Manipulation of knob 61 moves the shutter blades 51 towards and away from each other so as to limit light entering port 28. Direction of turning of knob 61 to open or to close the shutter means may be indicated on the casing or on the knob by indicia in well known manner.

Means for modifying light passed through port 28 and for directly determining color characteristics of such light may be provided by a combined longitudinally slidable scale and filter carrier means generally indicated at 65 (Fig. 7). The carrier means includes parallel adjacent planar filter strips 66, 67, 68 supported at their ends by longitudinally extending parallel slide members 69. The slide members 69 may be supported and guided for longitudinal movement in side grooves 70 provided in side walls 24 above shutter blades of the shutter means. The top surface of one sliding member 69 may be provided with upwardly directed rack teeth 71 engaged by a gear wheel 72 carried by a tubular sleeve 72a journaled over a cylindrical end portion of polygonal shaft 43. A carrier turning knob 73 is fixedly mounted on the end of the extension 72a whereby turning of knob 73 will cause the carrier means 65 to slide longitudinally above bottom wall 23 to selectively position a filter strip over light-admitting port 28.

Means to precisely position a filter strip with respect to port 28 may include longitudinally spaced detent holes 74 in the side wall 24 of the casing selectively engaged by an inwardly biased detent member 75 carried on an adjacent post 77 of the carrier means.

Scale means positioned in correlation with the filter strips and for observation beneath scale window 26 may include a rearwardly extending flat wall 78 disposed in a plane spaced above and parallel to the plane of the filter strips and supported and connected to slide members 69 by upstanding rearwardly inclined posts 77. The top surface of wall 78 is provided with three parallel adjacent transversely extending scales 79, 80 and 81 respectively associated with blue filter strip 68, green filter strip 67 and red filter strip 66. Thus selective positioning of a filter strip in operative relation with port 28 simultaneously automatically positions a correlated scale beneath scale window 26.

When photo cell 42 is positioned to receive light through port 29, means are provided to automatically move a selected scale (other than scales 79, 80 and 81) into position beneath scale window 26. A scale 83 for indicating measurement of incident light may be provided on the top surface of a second scale strip 84 which may be longitudinally slidable in a plane above wall 78 by reception of side margins thereof into parallel longitudinally extending grooves 85 in side walls 24. The scale strip 84 may include at one side and adjacent one end a depending toothed portion 86 engageable with a toothed gear segment 87. The gear segment 87 is mounted on shaft 43 between the interior boss-like portion of knob 45 and the opposed end of member 40. Thus as knob 45 is turned to position photo cell 42 in the path of light admitted through port 29, the scale 83 is automatically moved into reading position below scale window 26 and over scales 79, 80 and 81. The scale strip 84 may carry indicia such as "CC" and "EM" positionable under window 27 upon movement of the cell 42 to indicate whether the cell is positioned for measuring color characteristics of light admitted through port 28 or intensity of illumination of incident light admitted through port 29.

It is understood that while a scale strip 83 having a depending rack portion is illustrated, said scale strip may include a strip of material with spaced longitudinal perforations at its sides which may engage gear segment 87.

Operation of the three color and exposure meter shown in Figs. 1 to 8 may include measurement of incident light which indicates intensity of light falling upon the subject being photographed. To measure incident light, knob 45 may be turned so as to position photo cell 42 to the front to receive light admitted through port 29 and the translucent end member 38. Positioning of the photo cell also automatically moves scale 83 rearwardly into observable position beneath scale window 26. Proper positioning of the cell and scale is indicated by the letters "EM" which may be seen through window 27.

To measure incident light, it will be noted that all of the light admitted through port 29 impinges upon cell 42 and shutter means 50 is not required to be operated because it limits light admitted only through port 28. Light striking the light sensitive face of the photocell 42 causes an electrical response in said cell which is transmitted to the microammeter 47 which responds by movement of index 48 to a certain position above the scale 83. Scale 83 may be calibrated in foot candles and/or "F" stop so as to directly read intensity of illumination in well known manner.

While exemplary photometer 20 is illustrated as having only a translucent light-admitting member 38 to measure incident light, it will be readily understood by those skilled in the art that, if desired, member 38 may be removable and a reticulated grid member (not shown) may be inserted over light-admitting port 29 so as to read intensity of illumination of light reflected from the subject being photographed.

When it is desired to measure color characteristics of light, the photo cell 42 is positioned opposite light-admitting port 28 in bottom wall 23 of the casing. Position of said cell is indicated through window 27 by the letters "CC," said cell being so positioned by turning of knob 45. Light is received by said photocell 42 after passing through port 28 and a selected light-modifying means such as a red, blue and green filter 66, 68 and 67 respectively. Color temperature, color quality, or a particular color filter to be used to modify light admitted to provide true color rendition for a particular type of color film being used may be conveniently determined by providing reference marks such as B, A, F, and D (Fig. 3) on the green scale to reference the amount of red and blue light to the green light. Assuming the color film type used is D, the green filter 67 is first operatively positioned between port 28 and cell 42 by turning knob 73 which moves the scale and filter carrier means 65 longitudinally to simultaneously operatively position both green filter 68 and associated scale 80, this positioning being accurately determined by cooperation of resilient element 75 and a detent opening 74. Shutter means 50 may then be adjusted by shutter knob 61 so as to limit the amount of light received by photo cell 42, the response of the cell to such light admitted positioning index 48 at the selected reference mark on green scale 80, in this example D.

Without changing the position of the shutter means 50 as determined above, knob 73 is then turned to position blue filter 68 in operative relation with the light-admitting port, such positioning simultaneously moving blue scale 79 into position beneath scale window 26. Change in position of index 48 will then indicate the ratio of blue to green light. If index 48 is positioned other than at zero indicia, the type of blue filter such as plus one or minus one is indicated on blue scale 79, such plus or minus blue filter serving to correct the amount of blue light being received and to compensate for the blue sensitivity of the color film. The same procedure may be followed with respect to the red filter, such red filter being positioned by turning knob 73, the shutter means 50 remaining unchanged, and the plus or minus red correcting filter will be indicated by change in position of index 48. By using the indicated red and blue correction filters, the light admitted to the film will be modified so as to provide true color rendition on that particular type of color film used. Each of the red, blue, and green scales may also carry indicia in degrees Kelvin to indicate color temperature if color temperature reading is desired.

By using the color temperature reading of both ratios of blue to green light and of red to green light, an accurate determination of the color characteristics of light is achieved and such results may be readily correlated to the particular means employed to modify the light to produce a true color balance within specified tolerances of photographic color film being used. It is understood by those skilled in the art that the light may be readily correlated to the particular type of color film used by employing well known compensating filters, or changing the voltage applied to filaments of the light source, or by supplementing the light source with additional light of predetermined spectral characteristics.

While the above description of an exemplary determination of color characteristics of light employs a method of using ratios of the amount of light of three separated wave length bands, in the visible spectrum, it is understood that the scales for the red, blue and green light may be calibrated in different manner so that the amount of blue, green and red light may be separately and individually determined. Also the scales may be so calibrated as to determine color characteristics which utilize only the ratio of the amount of light in the two most widely separated wave length bands such as red and blue. Likewise, the scales may be so calibrated as to provide indicia whereby spectral characteristics of a discontinuous spectrum band may be analyzed as described in my United States Letters Patent No. 2,587,602.

It will thus be apparent to those skilled in the art that the exemplary embodiment of the above described combined three color and exposure photometer provides a compact versatile accurate device for determining intensity of illumination of light and for adaptation to accurate direct determination of color characteristics of light. The above described method of operation showing measurement of color characteristics by an analysis of more than two spaced wave length bands is of growing importance because of the necessity for more accurately determining the color characteristics of light in order to produce true color balance and rendition on photographic color film.

It will thus be readily apparent to those skilled in the art that this invention discloses a compact simply constructed combination 3-color and exposure photometer which is capable of quickly and accurately determining the intensity of illumination of light and color characteristics of light by several different procedures. It will be noted that the walls of the casing are provided in this example with a scale window and with two light-admitting ports in spaced relation. The two light-admitting ports admit light along different paths. It will be understood that the spaced ports may be provided on any one or more of the walls of the casing as long as light beams are introduced into the casing in relation to the changed position of the movable cell. The scale means associated with respective light-modifying elements or light-admitting elements are automatically and simultaneously positioned upon movement of said elements into operative position with respect to a photo cell. It is readily understood that relative movement between such light-modifying elements and a photo cell may be provided in various different exemplary constructions. The advantages of the exemplary constructions described above are evident to those skilled in the art since they provide an effective simple means for measuring color characteristics of light by measuring and comparing the ratio energy of light from widely separated wave length bands in the visible spectrum.

Various modifications and changes may be made in the examples of this invention described above and all such modifications and changes coming within the scope thereof are embraced thereby.

I claim:

1. In a combination color and exposure photometer including cooperably associated meter and index, the combination of: a hollow casing having parallel side walls and a peripheral wall joining said side walls, one of said side walls being provided with a scale window, the other of said side walls being provided with a light-admitting port, said peripheral wall also being provided with a light-admitting port; a light-responsive cell movably positionable to receive light admitted by a selected port; diaphragm means carried by the casing to limit light admited through at least one of said ports; a pair of scale means, each including a scale strip operably positionable with respect to said scale window, light-filter means including adjacent filter strips to modify light falling on said cell through the said one port, said pair of scale means and filter means lying in parallel spaced planes proximate to side walls of the casing, one of the pair of scale means and filter means being interconnected for simultaneous shifting movement; means within the casing for moving said cell; and means for operatively interconnecting the movable cell and the other of said pair of scale means for moving said other of said pair of scale means beneath said scale window when the movable cell is positioned to receive light from the other of said ports.

2. In a photometer as stated in claim 1 including means separate from said cell-moving means and connected with said one of said pair of scale means and said filter means for shiftably moving the scale and filter means.

3. A photometer as stated in claim 1 wherein the light-responsive cell is pivotally mounted.

4. A photometer as stated in claim 1 including a carrier means slidably mounted in the casing for supporting said one of the pair of said scale means and said filter means.

5. A photometer as stated in claim 4 including means on the casing engageable with means on said carrier means to shift said carrier means relative to said cell.

6. A photometer as stated in claim 1 including means slidably mounting said other of said pair of said scale means in said casing.

7. A photometer as stated in claim 1 wherein said pair of scale means lie in spaced proximate parallel planes.

8. A photometer as stated in claim 1 including translucent light-collecting means carried by the casing and positioned over one of said ports.

9. In a combination color and exposure photometer including cooperably associated meter and index, the combination of: a hollow casing provided with a scale window and with two light admitting ports in spaced relation and arranged to admit light along different paths; a light responsive cell movably positioned to receive light admitted by a selected port; diaphragm means carried by the casing to limit light admitted through at least one of said ports; a pair of scale means, each including a scale strip operably positioned with respect to said scale window; light-filter means including adjacent filter strips to modify light falling on said cell through the said one port; means interconnecting one of the pair of scale means and filter means for simultaneously shifting said one of the pair of scale means and filter means; means within the casing for moving said cell; and means operatively interconnecting said movable cell and the other of said pair of scale means for moving said other of said pair of scale means beneath said scale window when the movable cell is positioned to receive light from the other of said ports.

References Cited in the file of this patent

UNITED STATES PATENTS

| | | |
|---|---|---|
| 2,462,823 | Woodward | Feb. 22, 1949 |
| 2,467,304 | Gannon | Apr. 12, 1949 |
| 2,528,716 | Williams et al. | Nov. 7, 1950 |
| 2,579,661 | Freund | Dec. 25, 1951 |
| 2,585,245 | Harrison | Feb. 12, 1952 |
| 2,730,009 | Poirette | June 10, 1956 |

FOREIGN PATENTS

| | | |
|---|---|---|
| 640,117 | Great Britain | July 12, 1950 |